US009916706B1

(12) United States Patent
Gardner et al.

(10) Patent No.: US 9,916,706 B1
(45) Date of Patent: Mar. 13, 2018

(54) CUSTOMER VEHICLE MANAGEMENT SYSTEMS AND METHODS

(71) Applicants: Wayne Gardner, Park Ridge, IL (US); Luke Gardner, Park Ridge, IL (US); Edwin T. Horton, Wildwood, MO (US); Ronald Dir, Sturtevant, WI (US)

(72) Inventors: Wayne Gardner, Park Ridge, IL (US); Luke Gardner, Park Ridge, IL (US); Edwin T. Horton, Wildwood, MO (US); Ronald Dir, Sturtevant, WI (US)

(*) Notice: Subject to any disclaimer, the term of this patent is extended or adjusted under 35 U.S.C. 154(b) by 0 days.

(21) Appl. No.: 15/432,870

(22) Filed: Feb. 14, 2017

(51) Int. Cl.
*B60Q 1/48* (2006.01)
*G07C 9/00* (2006.01)
*G06Q 30/02* (2012.01)
*H02J 7/02* (2016.01)
*H02J 7/00* (2006.01)
*B60R 25/24* (2013.01)
*B60R 25/40* (2013.01)

(52) U.S. Cl.
CPC ..... *G07C 9/00103* (2013.01); *G06Q 30/0281* (2013.01); *H02J 7/0047* (2013.01); *H02J 7/025* (2013.01); *B60R 25/24* (2013.01); *B60R 25/406* (2013.01); *G07C 2009/00587* (2013.01); *G07C 2009/00936* (2013.01)

(58) Field of Classification Search
CPC .... G08B 3/1025; G08B 3/1075; G08B 5/224; G07B 15/02
See application file for complete search history.

(56) References Cited

U.S. PATENT DOCUMENTS

2009/0243797 A1* 10/2009 Leung ................. G07F 17/0092
340/5.73
2013/0113604 A1* 5/2013 Marzec ................. G07B 15/02
340/7.21

* cited by examiner

*Primary Examiner* — Nabil Syed
(74) *Attorney, Agent, or Firm* — John F. Rollins

(57) ABSTRACT

A customer vehicle management system includes fob devices that each include a customer portion and a key portion, that are separable and may be magnetically interlocked with a charging and communication link between them. The system provides dynamic association of fob customer portions, fob key portions and docking units housed within a cabinet. Customer portions are deployed to a customer (driver) who may later request retrieval of a vehicle the keys of which were left with an operator (valet). Vehicle requests are made through a wireless link. A communications and management module within a fob and key storage cabinet receives the request signal and activates an indicator on a docking unit associated with the customer portion and where an associated key portion is docked. The operator may then retrieve vehicle keys associated with the customer portion from which the request was made.

18 Claims, 15 Drawing Sheets

CUSTOMER VEHICLE MANAGEMENT SYSTEMS AND METHODS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Technical Field

The disclosure relates to customer vehicle management systems and methods, including systems for managing valet parking of vehicles, and related methods of operating and using such systems.

2. Prior Art

The prior art includes systems and methods for managing vehicles, including in a valet parking setting. For example, such systems and methods are described in US published application 2012/0194354 to Kundmueller. This document describes a valet communication system in which the customer is given a transmitter, which is linked to a corresponding key holder location in a kiosk. When the customer activates the transmitter, a corresponding indicator on the key rack is activated to identify the key to the valet. The valet retrieves the key and then the vehicle. U.S. Pat. No. 6,097,106 to Roddy describes a two-part transmitter housing. A first part is kept by the vehicle owner. The second part may include an indicator which notifies a valet that a vehicle owner desires the valet to retrieve the vehicle.

There is a need in the relevant art for systems and methods which offer improved communications infrastructure and key fob structures and operations to enhance user (customer) and operator (valet) experience and prevent errors and delays associated with customer experience, vehicle management and retrieval.

There is a further need for systems and methods which enhance the two-way communication that a customer may have with an operator (valet) in order to convey customer requests, vehicle status and other information to both the customer and operator.

There is a further need for adaptive and flexible fob registration systems and methods which enable intelligent and automatic registration of key storage locations in a central key storage unit and to help to eliminate the instances of lost or erroneously located keys within the system.

There is a further need for systems and methods which offer improved user-friendly interaction with customers in vehicle management settings, such as valet parking settings.

There is a further need in the art for customer vehicle management systems which are easy and relatively inexpensive to manufacture, install, operate and maintain.

SUMMARY OF THE INVENTION

According to one aspect of the disclosure, a customer vehicle management system may be provided as a plurality of fob devices stored within a portable fob storage, management and communication (SCM) cabinet that may be easily deployed to a vehicle management area. The cabinet includes base and sealable door that define a protected and secure interior space. The cabinet base may have a number of fob device docking units for releasably storing the fob devices. Fob device storage capacity is increased by one or more interior storage panels, each having a number of fob storage docking units defined on front and back surfaces thereof may be mounted within the cabinet interior space and may be pivotally or removably mounted to the cabinet. The storage box includes a cover that may seal the interior of the box against harsh external conditions such as moisture, precipitation or extreme temperatures, and which may be locked securely to prevent theft of or tampering with the internal components, including the fob devices.

According to another aspect of the disclosure, the fob may be provided as a two-part device, having two or more parts that may be magnetically interlocked so as to remain as a single assembly but also readily separated when deployed to a customer, with the valet retaining a key portion of the fob with the vehicle key, and the customer retaining a customer portion of the fob in order to later initiate a request for the vehicle or communicate other information to the valet. Both the key portion and customer portion may be provided as sealed units, having no exposed contact elements for charging or communication. The customer portion may include a transceiver, such as an RF transceiver.

According to another aspect, the fob storage, management and communication cabinet includes a communication and management module which includes a communication gateway which may be an RF communication gateway and which enables a point-to-multi-point communication protocol and centrally-controlled communication with each of the fob elements. All fob devices may communicate to a single transceiver located in the storage, management and communications ("SCM") cabinet. This configuration eliminates the need for a separate transceiver to communicate with each fob device, resulting in reduced cost and power consumption. Moreover, the SCM cabinet may power a high gain antenna to enhance range and/or reduce needed power consumption. The storage box may be provided with a communication system including a communications module for establishing two-way communications with a plurality of uniquely addressable fob devices.

According to another aspect of the disclosure, the fob devices may be inductively charged when inserted into a docking unit. Respective charging circuits and interfaces facilitate inductive charging between the respective docking unit and the fob key portion, as well as between the fob key portion and the fob customer portion. Each inductive charging circuit may include a modulating element which enables modulation of the inductive charging using a change in clock frequency, similar to Frequency-shift Keying (FSK). This modulation of the charging circuits provides a secondary channel for communication of data or information between the docking unit and fob key portion, and between the fob key portion and fob customer portion. The inductive coupling may facilitate this communication and reduction or elimination of interference between neighboring docking units and respective associated fob devices. The inductive charging signal may be modulated in amplitude in order to permit low-power messaging to be sent between the customer portion and the key portion. This messaging may occur reliably and without interference with other communications channels, such as the RF signals used by the communication module to communicate with deployed fob devices.

According to another aspect of the disclosure, the communications and management module facilitates dynamic mapping of docking units and fob devices such that fob devices can be placed by an operator in any docking unit within the cabinet and the fob device may be automatically associated with a particular docking unit. Association of particular customer portions with respective key portions is also dynamic such that information identifying a particular customer portion is conveyed to a paired key portion. In turn, the customer portion and key portion are dynamically associated with a docking unit such that a customer request results in activation of an indicator on the docking unit with which the customer portion and key portion are associated, thereby permitting the operator to quickly obtain the correct vehicle keys and retrieve the correct vehicle. According to another aspect of the disclosure, the magnetic coupling between the fob portions may be used to provide a signal to the docking unit to indicate that a fob key portion and/or fob customer portion have been inserted or removed from a given docking unit.

According to another aspect of the disclosure, the indicator on the customer portions or docking units may include one or more LED elements and use various signals, such as LED color, blinking rate, light duration to signify information to the customer or to the valet attendant. For example, blinking rate of a single LED may be used signify aging vehicle requests to an attendant. According to another aspect, a cancellation request may be initiated by a customer for a predetermined time after an initial retrieval request.

According to another aspect, methods of operating a vehicle management system may include point to multipoint communication with a number of deployed customer portions, methods of dynamically mapping or assigning customer and key portions of fob units to respective docking units, methods of processing customer initiated vehicle and other requests.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto.

FIGS. 21-28 depict an ornamental design for a customer fob portion according to an aspect of the disclosure in which:

FIG. 21 is a top perspective view of a customer fob portion showing the design;

FIG. 22 is a bottom perspective view of the customer fob portion of FIG. 21;

FIG. 23 is a top view of the customer fob portion of FIG. 21;

FIG. 24 is a bottom view of the customer fob portion of FIG. 21;

FIG. 25 is a left side view of the customer fob portion of FIG. 21;

FIG. 26 is a right side view of the customer fob portion of FIG. 21;

FIG. 27 is a front view of the customer fob portion of FIG. 21; and

FIG. 28 is a rear view of the customer fob portion of FIG. 21.

DETAILED DESCRIPTION

In order to distinguish between separate but identical components utilized in exemplary systems described, this detailed description will utilize designations such as ".1" and ".2" to refer to identical but separate instances of components. For example, the designations "300.1" and "300.2" may refer to respective separate, but identical, fob customer portions. Relatedly, a general reference, such as "300" will be used to refer generally to all such separate but identical elements.

Figure 1:
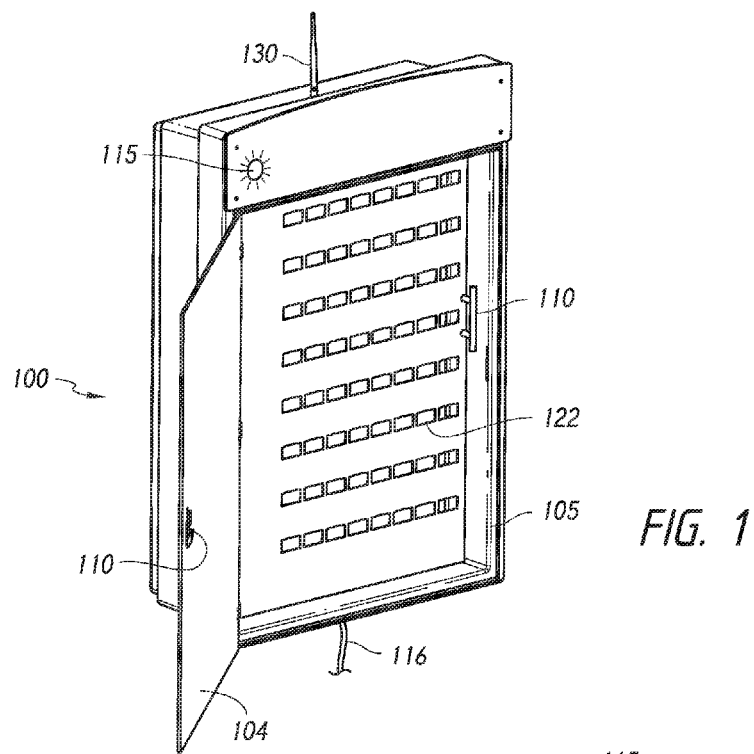
FIGS. 1 and 2 are front perspective views of an example fob storage, communications and management ("SCM") cabinet for a customer vehicle management system according to an aspect of the disclosure.
Figure 2:
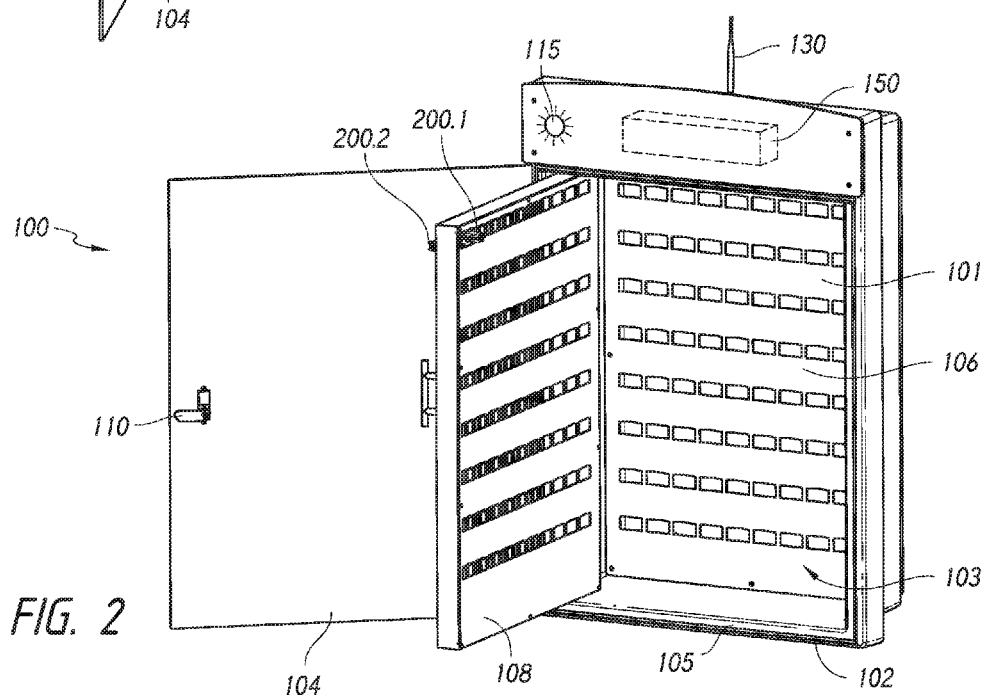
Figure 3:
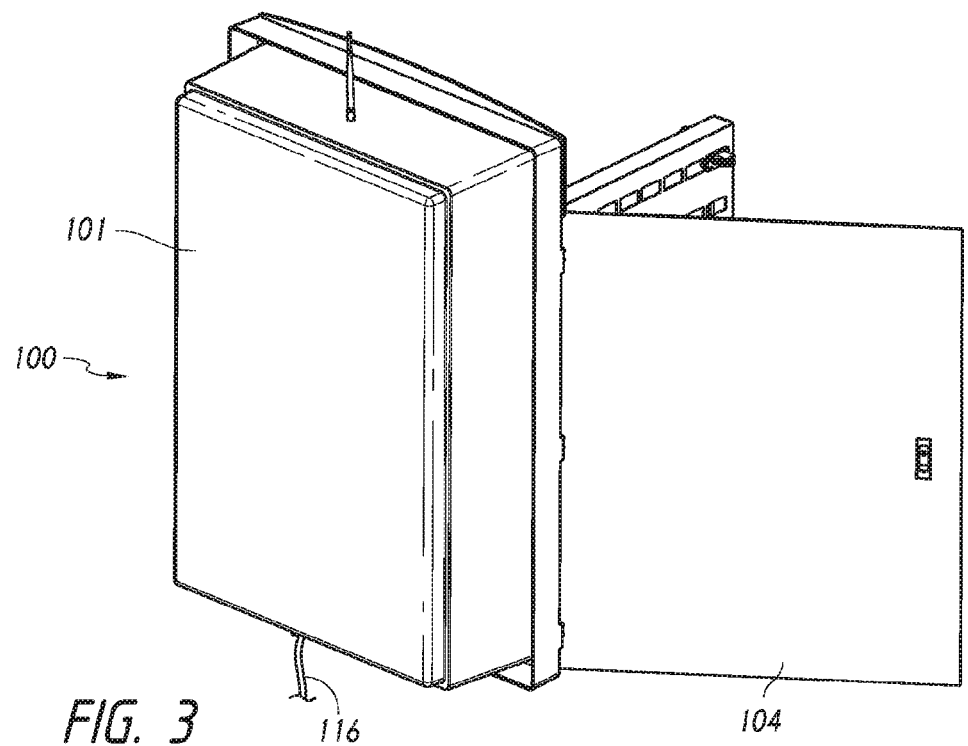
FIG. 3 is a rear perspective view of an example SCM cabinet for a customer vehicle management system according to an aspect of the disclosure.

FIGS. 1-3 are perspective views of an example fob storage, communications and management ("SCM") cabinet, generally referenced 100, in an example system according to an aspect of the disclosure. A cabinet base 102 may have a generally rectangular shape including a rear wall 101 and four sidewalls which define an interior space 103. A fixed rear panel 106 may be housed within the cabinet base 102 and includes a number of docking unit receiving apertures or cutouts 122, which may have a rectangular shape for securely retaining respective docking units 200, as will be described below. For additional storage, an interior panel 108 may be pivotally and/or removably mounted within the interior space of the cabinet 103 and provided with a handle 111. The interior panel may include opposed walls each having a number of additional cutouts 122, each for receiving and supporting respective docking units. Cutouts 122 may be staggered such that one cutout on a given wall is located between two cutouts on the opposite wall, in order to prevent docking units and retained fobs from physically interfering with one another and to maximize storage capacity. A cabinet door 104 may be pivotally mounted to the cabinet base 102 and may include a locking feature 110 to prevent tampering and/or theft of internal components. A power cord 116 provides AC power to the cabinet. As an alternative power configuration, the unit may be provided with an energy storage device, such as a rechargeable DC power supply capable of supporting system operation for a suitable time, such as 8 hours. A recharging system may be provided to allow the system to recharge when grid power is available. This would permit operation in areas where grid power is not readily available or has been interrupted.

An operator notification device 115, which may include a light and/or audible signal, may be disposed on the exterior of the cabinet 100. Notification device 115 may signal an operator (valet) that a vehicle request has been received, or to indicate other status of the cabinet 100. Cabinet door 104 may be made from a transparent material to enable an operator to view the docking units 200 and fobs while the door is closed. A sealing gasket 105 may be provided to weatherproof the cabinet interior when the door 104 is closed. Panels of the cabinet 100 may be provided with back lighting for aesthetic purposes and for illuminating the cabinet interior. The walls of panel 108 and rear wall 101 may include surface treatments to enable temporary erasable notes and/or other markings using, for example, dry erase markers.

Figure 4:
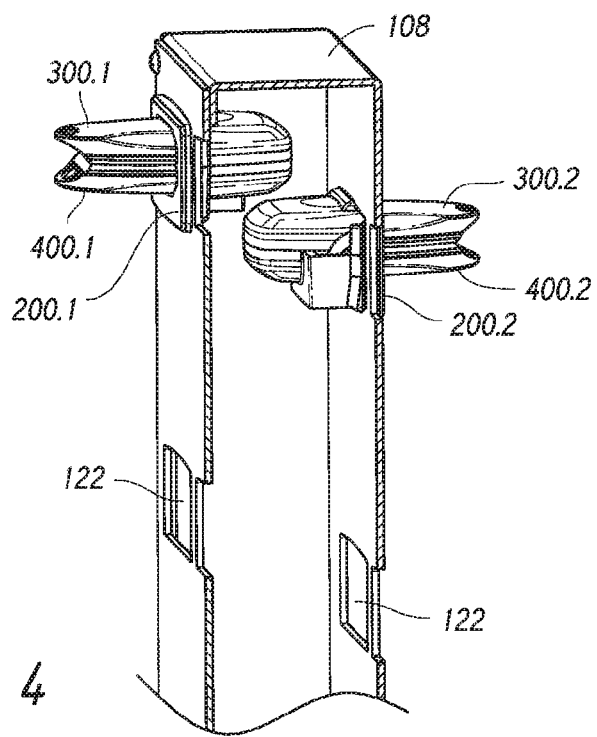
FIG. 4 is a sectional view of an interior storage panel for an SCM cabinet including two paired and docked fob devices in respective docking units in an an example customer vehicle management system according to an aspect of the disclosure.

FIG. 2 and FIG. 4 illustrate a pair of docking units 200.1 and 200.2 supported in respective cutouts 122. Docking units 200 are each configured with respective slots or recesses, shaped complimentarily to mated fob portions to receive a fob pair, which includes a customer fob portion 300 and a key fob portion 400. Docking units 200 may be made of a flexible elastomeric or rubber material to provide for secure retention of the fob portions. Further details of the the docking units 200, customer fob portion 300 and key fob portion 400 will be explained below. The SCM cabinet may include internal communication and fob management and communication resources, as will be described below, and an antenna 130 for transmitting and receiving RF signals.

Figure 13:
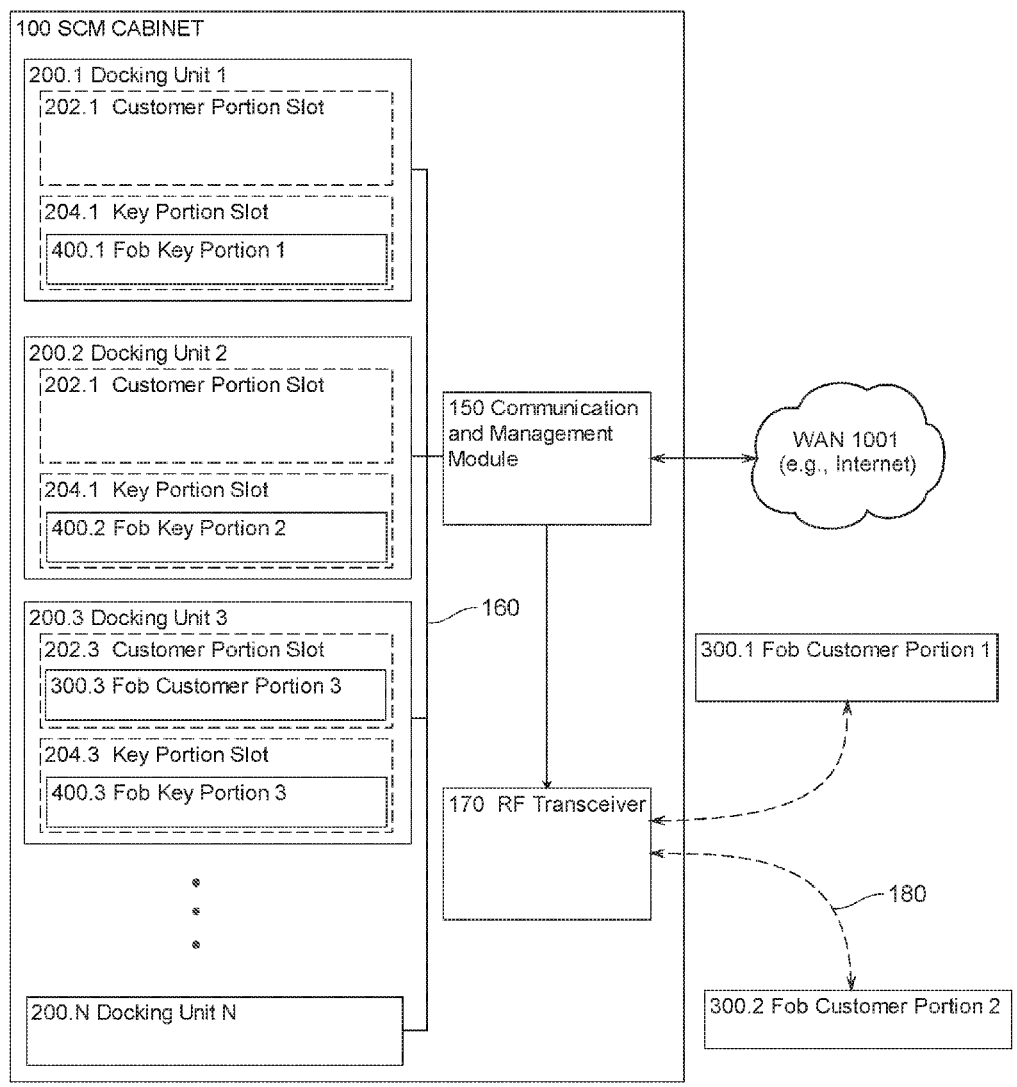
FIG. 13 is a schematic diagram of example components of system including an SCM cabinet and communication and management module according to an aspect of the disclosure.
Figure 17:
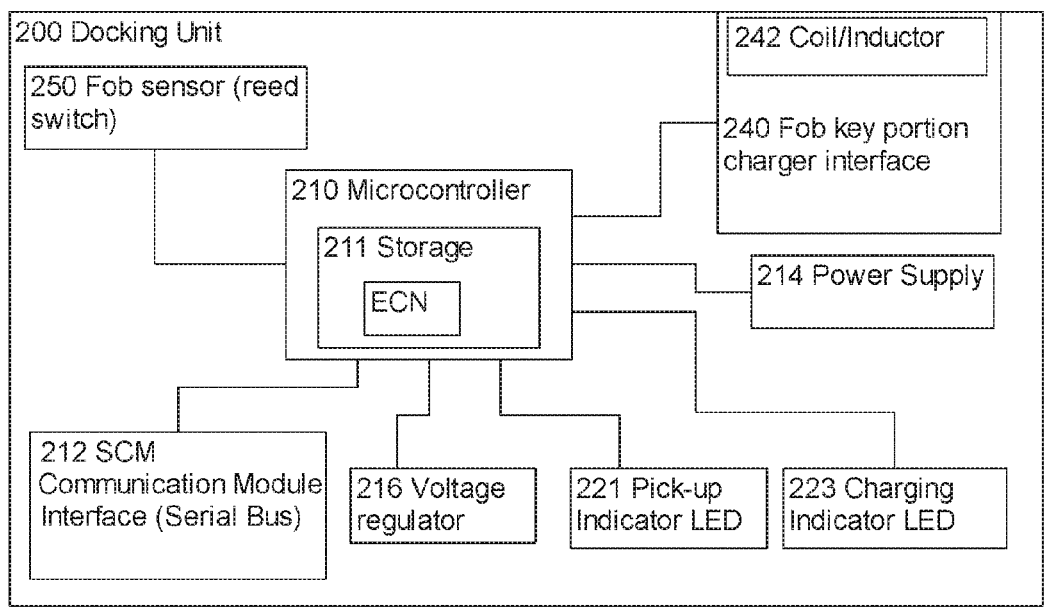
FIG. 17 is a schematic diagram of an example docking unit according to aspects of the disclosure.

Referring additionally to FIGS. 13 and 17, docking units 200 are in electronic communication, for example, via a four-wire synchronous serial bus, with a communication and management module (CMM) 150 within the cabinet, which acts as a master element to control and communicate with the docking units 200. Docking units 200 each include a microcontroller 210 with an electronic storage (memory) encoded with a permanent serial number or MAC address unique to each respective docking unit. The CMM 150 may periodically and constantly poll the serial bus to assess the status of each docking unit 200 by transmitting data representing the MAC address of each docking unit 200 and receiving responses in a serial data stream back from each docking unit 200. In this manner, as will be explained in more detail below, the status of each docking unit 200, and the presence or absence of a customer fob portion, key fob portion or both, may be communicated to the CMM and appropriate management and control of functions of each docking unit can be facilitated.

FIG. 4 is a detailed cross-section showing showing how docking units 200 may be secured within rectangular cutouts 122 in the interior panel 108, and further receive and support a fob pair. Docking unit 200.1 is retained in the rectangular cutout and houses a fob pair comprising a fob customer portion 300.1 and a fob key portion 400.1. In use, the customer portion 300.1 would be deployed to a customer to enable the customer to initiate a vehicle request. The key portion 400.1 is removed from the cabinet and attached to the customer's vehicle key, then re-docked in docking unit 200.1 (or another docking unit). A second docking unit 200.2 houses a second customer portion 300.2 and second key portion 400.2. As will be recognized, each cutout in cabinet 100 may support a docking unit 200 and have associated therewith a fob pair comprising a key portion 400 and customer portion 300 to enable the management of a like number of customers and vehicles using the example system.

Figure 5:
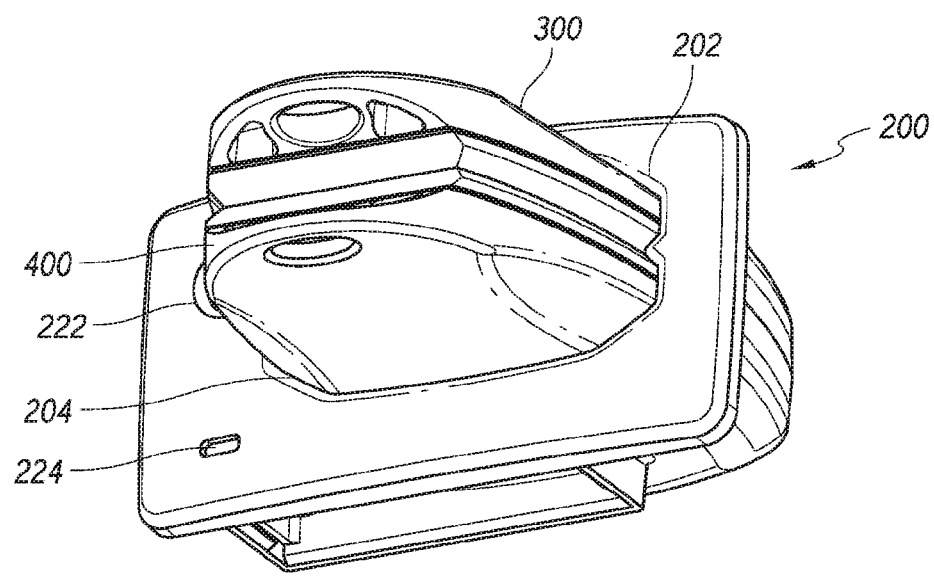
FIG. 5 is a front perspective view of an example fob, including a mated or paired fob customer portion and a fob key portion, in a docking unit in an example customer vehicle management system according to an aspect of the disclosure.
Figure 6:
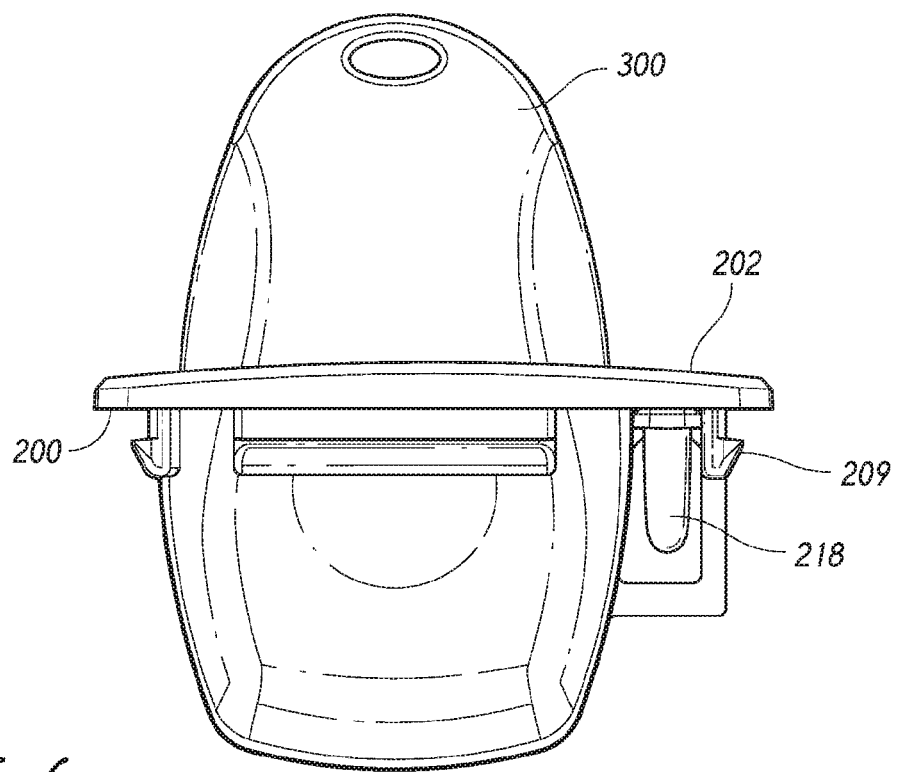
FIG. 6 is a top view of an example fob assembly, including a mated fob customer portion and a fob key portion, in a docking unit in an example customer vehicle management system according to an aspect of the disclosure.

FIGS. 5 and 6 illustrate further details of a fob docking unit 200. The docking units may include internal electronic components for facilitating communication with the fob key portion and fob customer portion, as will be explained. A docking unit pick-up indicator 222, which may be a single or multi-color LED, may provide different status notifications to an operator of the SCM cabinet, such as a valet. The docking unit may include a plastic face plate 220, which has a top docking recess or slot 202 for receiving a customer fob portion 300, and a bottom docking recess or slot 204 for receiving a key fob portion 400. Docking unit 200 may include flexible plastic retaining barbs 209 to allow the docking unit to be easily inserted into and retained in the cutouts 122, such as with a snap fit for easy assembly. According to an aspect of the disclosure, each docking unit is in electronic communication with the communication and management module 150 via a serial bus, which may be an asynchronous serial bus, that may be implemented using conductive paths formed in the panel walls in which the docking units are retained. Electronic communication of the docking units to the CMM may be supported by a suitable multi-conductor (i.e., four-wire) ribbon cable, which may "daisy chain" the docking units to one another and to the CMM to support the serial bus architecture. Alternatively, printed circuit elements may be incorporated into the panels 108 between docking units and the CMM. As a further alternative, a separate circuit board may be utilized adjacent the panel walls. Docking units may have suitable electronic connections, such as pin connectors, to facilitate electronic connection to the conductive paths and ultimately to the communication and management module 150. Each docking unit may include an electronic storage memory which stores a unique electronic code, such as a simple 7-bit code, which uniquely identifies that particular docking unit. The communications and management module 150 may assess the status of each docking unit by sending a signal representative of the identifying code for each and every docking unit and receiving a response as to each particular docking unit's status. As will be recognized, this platform eliminates the need for particular fob key portions and fob customer portions to be associated with particular docking units. Rather, any fob portion or fob portion pair may be inserted into any docking unit and the communications and management module 150, by polling the docking units 200 via bus 160, may identify and associate the fob portion pair with one another and with a particular docking unit in which the fob key portion resides. More particularly, when a fob key portion alone, or a fob key portion paired/mated with a fob customer portion, are inserted into a given docking unit, the docking unit will relay the ESN of the fob customer portion to the communications module, and that customer portion ESN will be associated with the identifier for the corresponding docking unit. With this association stored in the communications and management module, a request from a particular fob customer portion can be correctly associated with it's companion fob key portion, and the docking unit in which that fob key portion resides within the cabinet. Thus, the appropriate docking unit pick-up indicator 222 may be activated to convey to the operator which key portion housed within the cabinet should be removed and utilized to retrieve the associated vehicle.

Figure 7:
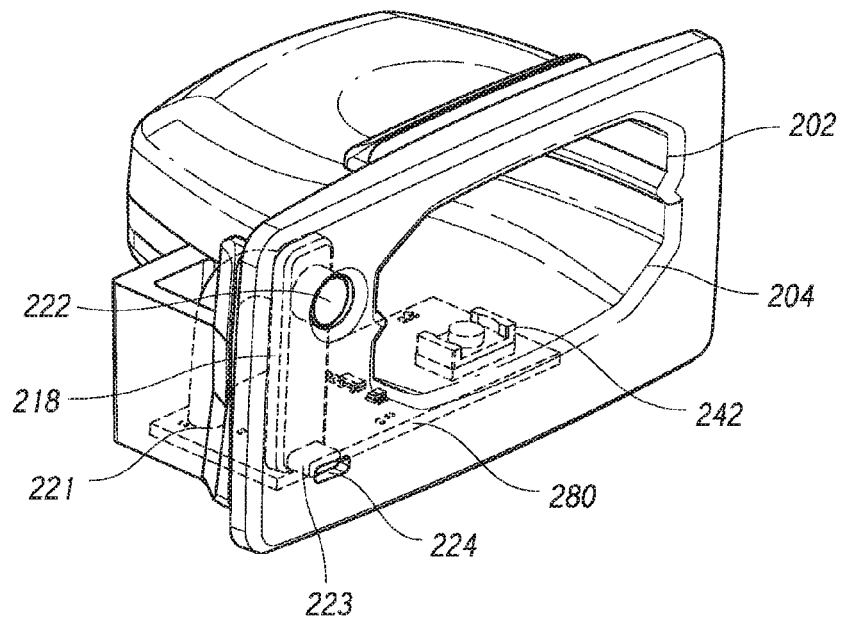
FIG. 7 is a perspective view of an example docking unit showing internal components.

Referring additionally to FIG. 7, according to an aspect of the disclosure, a pick-up indicator 222 may be facilitated using a light pipe 218, which may be an internally reflective prism of acrylic or optical plastic, may be utilized within the docking station to convey light from LED elements mounted on an internally housed docking unit circuit board 280 to the front of the docking unit as a pick-up indicator 222 and a charging indicator 224. Internal details of the docking unit are illustrated in a cutaway view shown in FIG. 7. A circuit board supports and connects the internal electronic components, including a pickup indicator LED 221 and a charging indicator LED 223 which communicate optically with separate sections/channels of light pipe 218 to convey light thru externally facing surfaces aligned with respective apertures in a faceplate of the docking unit 200 and thereby representing a pickup indicator 222 and charging indicator 224 that may be selectively activated by the circuitry as explained further below. Docking unit circuit board 280 also includes a docking unit inductor which functions to inductively charge and communicate with fob key portion 400 as will be explained.

Figure 8:
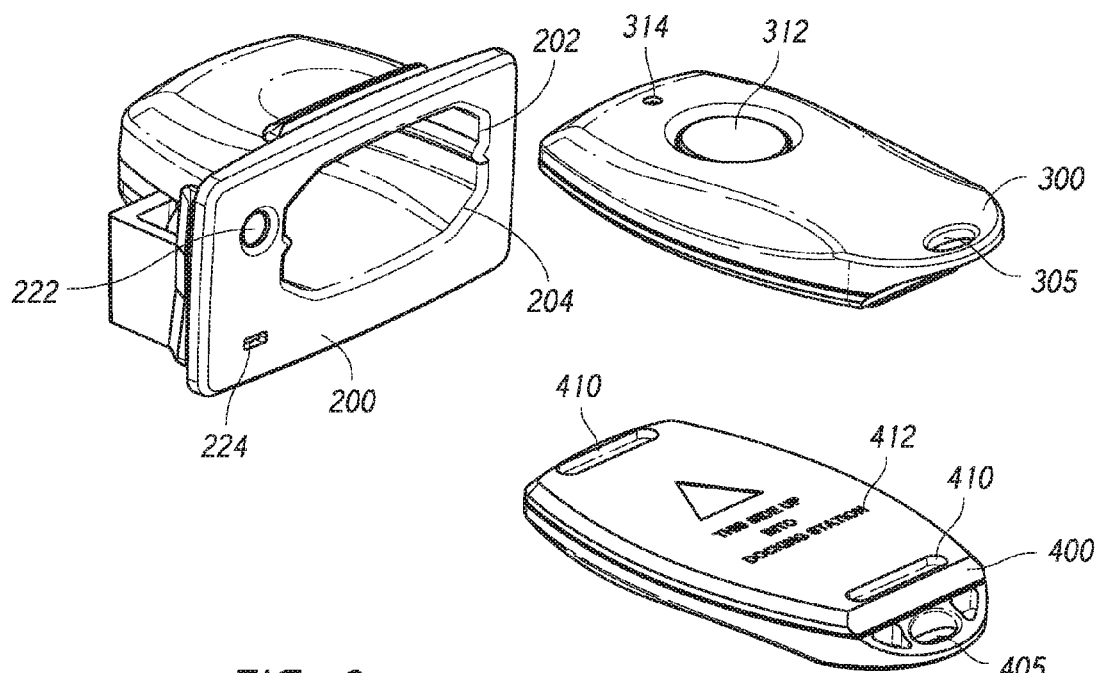
FIG. 8 is an exploded view of an example fob device, showing unmated fob customer portion and fob key portion, and a docking unit in an example customer vehicle management system according to an aspect of the disclosure.

Referring additionally to FIG. 8, the fob portions 300 and 400 are shaped to fit complimentarily together as a fob pair. The portions 300 and 400 may include internal magnets which attract them to one another to keep them as a unit, but also allow the portions to be separated when in use, such as when a valet provides the customer fob portion 300 to a customer while retaining the key portion 400 with the vehicle keys and stored in the SCM cabinet, as will be explained. The fob portions may include indexing features, such as slots 410 on the key fob portion 400 and complementarily-shaped projections 326 (FIG. 10) on the customer fob portion 300 which, in combination with the internal magnets, enable positive alignment and securing of the two fob portions. The customer fob portion 300 may include user interface components, such as a push button 312 and an indicator LED 314 for enabling a user to initiate a vehicle request and to understand the status of such request and other system messages, as will be explained. The customer fob portion 300 may be provided with sealing features to protect the interior electronic components from contamination by moisture and dirt, and to prevent tampering. Push button 312 and indicator 314 may be provided with silicone gaskets, for example, to seal those components. Key fob portion 400 may be provided with indicia 412 to indicate to an operator/valet its correct insertion and orientation in the docking unit 200. Customer portion 300 may have an attachment aperture 305 for permitting a customer to attach the fob portion 300 to his/her keychain. Fob key portion 400 may be provided with a similar attachment aperture 405 for allowing an operator to attach a vehicle key thereto. Alternatively, quick release mechanisms may be provided to enable quick removal and joining of one or more vehicle keys to the fob key portion 400.

Figure 10:
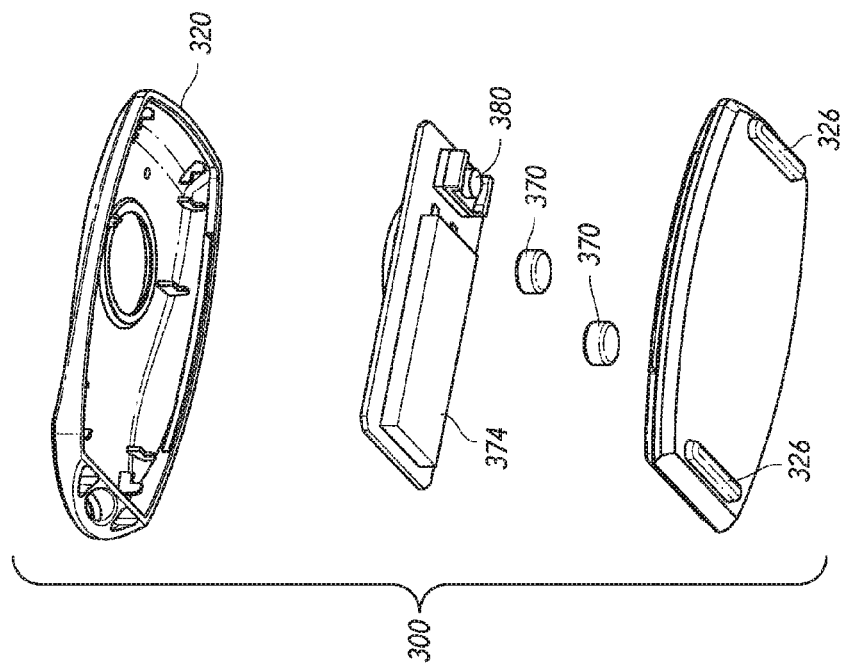
FIG. 10 is an exploded bottom perspective view of the components of an example fob customer portion according to an aspect of the disclosure.
Figure 9:
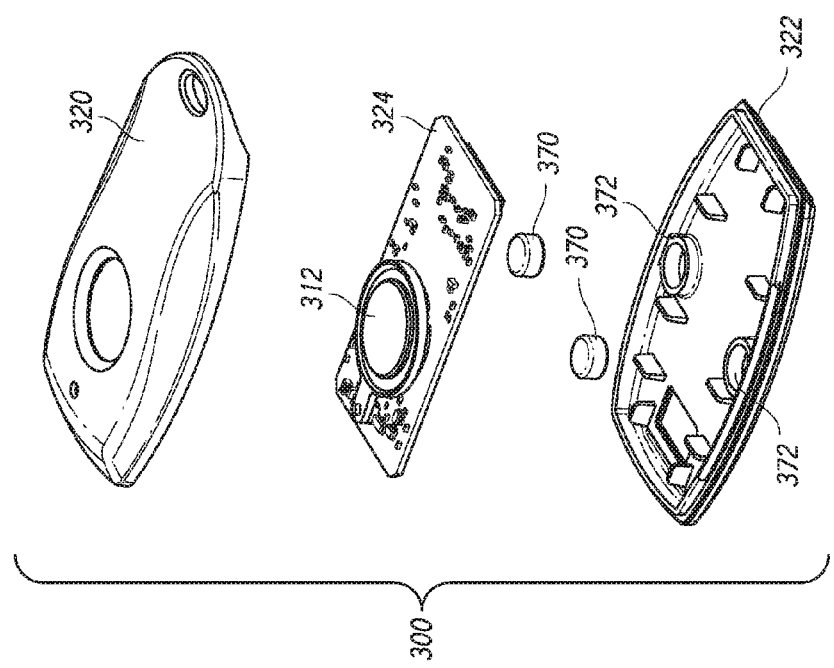
FIG. 9 is an exploded top perspective view of the components of an example fob customer portion according to an aspect of the disclosure.

FIGS. 9 and 10 illustrate exploded views of an example fob customer portion 300 including internal components. A top housing portion 320 and bottom housing portion 322 may define an internal space for housing a circuit board 324 having electronic components thereon, including push button 312 and inductive charging element 380. Magnets 370 may be retained within suitable recesses 372. Bottom housing portion 322 may include indexing projections 326 which fit within alignment slots 410 (FIG. 6) on the fob key portion to provide for positive alignment and secure retaining of the fob pair. A battery 374 provides power to the fob customer portion 300.

Figure 12:
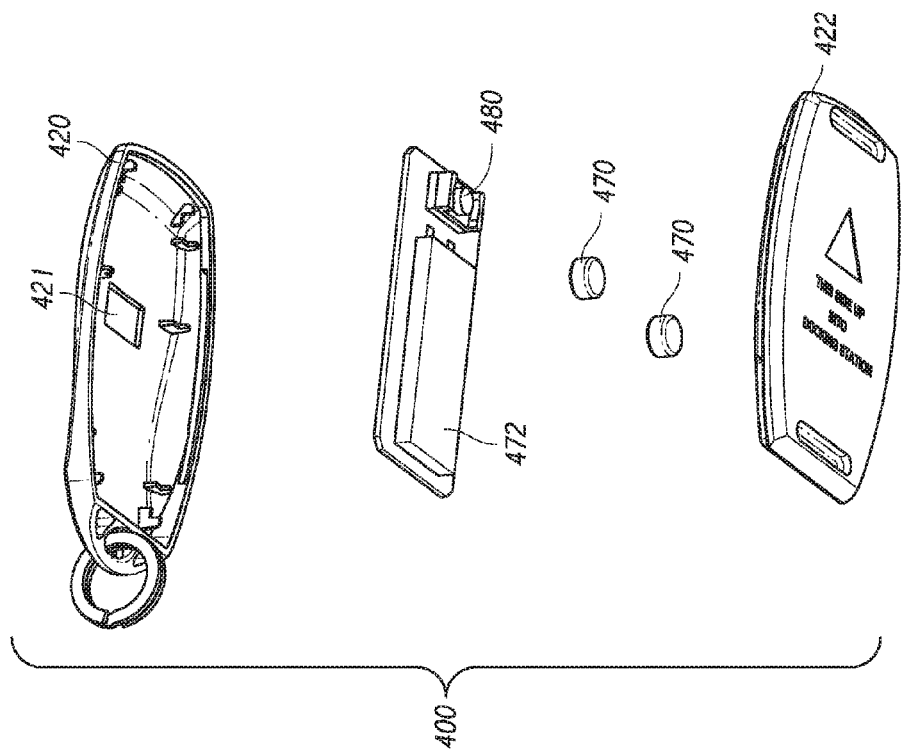
FIG. 12 is an exploded bottom perspective view of the components of an example fob key portion according to an aspect of the disclosure.
Figure 11:
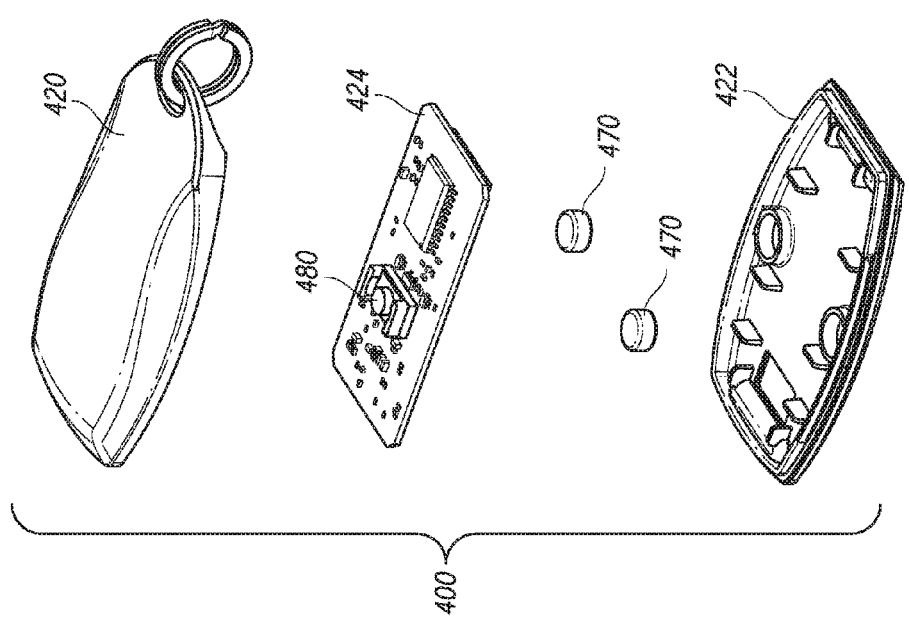
FIG. 11 is an exploded top perspective view of the components of an example fob key portion according to an aspect of the disclosure.

FIGS. 11 and 12 are exploded view of an example fob key portion 400 according to aspects of the disclosure. A top housing portion 420 and bottom housing portion 422 form an internal space for housing and sealing the internal components. A circuit board 424 supports and electronically connects the internal components including and inductive charging element 480 and a power supply, i.e., battery 472. Housing portion 420 may include a relief portion 421 for accommodating charging element 480 and permitting closer proximity of the charging element 480 with a counterpart inductive charging element on the docking unit 200. Magnets 470 provide for magnetic coupling of key portion 400 to customer portion 300.

FIG. 13 is a schematic diagram showing the key components of an example system according to an aspect of the disclosure. A communication and management module 150, which may be implemented in part by a microprocessor executing instructions stored in memory, is housed within the SCM cabinet 100. Communications module 150 is in electronic communication with each of the plurality of docking units 200 within the SCM cabinet via serial bus 160, which may be an asynchronous serial communications links or a serial communication bus. Docking unit 1 is schematically illustrated with a fob key portion 1 residing in a slot therein and a counterpart fob customer portion 300.1 shown deployed to a customer and remote from the SCM cabinet 100. Similarly, docking unit 2 has a fob key portion residing in a slot therein and a fob customer portion 300.2 deployed to a customer. Docking unit 3 has both a fob customer portion 300.3 and fob key portion 400.3 residing in respective slots in the docking unit. As will be recognized, although three docking units are illustrated, the cabinet 100 may contain several other docking units represented by docking unit 200.N. Each docking unit 200 communicates with the communication and management module 150 via serial bus 160.

Communications module 150 controls and communicates with an RF transceiver 170, for two-way communications via radio link 180, between the communication and management module 150 and each of the fob customer portions 400. Communications and management module 150 may include a link to a wide area network (WAN) 1001 to enable remote communication and management of the overall system, updating of software and data collection and analysis of various parameters monitored and collected by the system. According to an aspect of the disclosure, communications and management module 150 communicates with the fob customer portions 300 via a point-to-multipoint communication protocol (PMP), with a communication gateway for managing the communication between the plurality of fob customer portions 300.1, 300.2, 300.3 to 300.N and the communications and management module 150. Aspects of the PMP communication system may provide for the CMM transceiver to act as a master element, transmitting a relatively small packet/window of information, i.e., a 10 millisecond window every 100 milliseconds. A fob customer portion 300 may assume a "listening" mode based on customer interaction or automatically, where the fob customer portion 300 listens for a master packet transmitted from the CMM. This may be on a single channel to enable rapid communications, or in cases where multiple channels are implemented, for example, to prevent jamming or interference from geographically adjacent systems, the fob customer portion 300 may scan all available channels to listen for the master packet. Once the master packet is received, the customer fob portion 300 may transmit a message and then listen for an acknowledgement from the CMM as explained in more detail below with regard to FIG. 19.

Still referring to FIG. 13, the example system is shown with two customer-deployed fob customer portions 300.1 and 300.2, with their respective counterpart fob key portions 400.1 and 400.2 residing in respective slots 204.1 and 204.2 in docking units 200.1 and 200.2. Docking unit 200.3 houses a fob pair—customer portion 300.3 and key portion 400.3 held in a paired or mating arrangement wand within respective adjacent slots 202.3 and 204.3.

Figure 14:
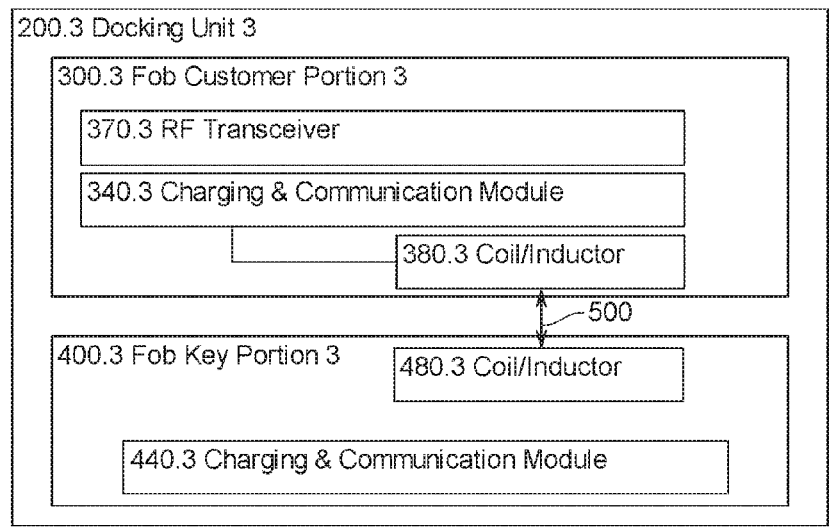
FIG. 14 is a schematic diagram of example components of a fob customer portion and a fob key portion residing within a docking unit (docking unit 3 in FIG. 13) according to aspects of the disclosure.

Referring additionally to FIG. 14, which is a schematic diagram of docking unit 3 of FIG. 13, according to an aspect of the disclosure, when paired together, the customer portions 300.3 and key portions 400.3 are equipped to provide for inductive charging from the key portion 400 to the customer portion 300, and bi-directional communication with each other via the inductive charging and communication link 500. As will be explained in more detail below, coil/inductor elements, 330.3, 430.3 are controlled by respective charging and communications modules 340, 440 in the customer portion 300 and key portion 400. Magnetic elements and indexing features may be provided on one or both of the fob portions 300, 400 to retain the inductive charging elements in a precise, aligned relationship. This communication and charging link 500 permits any customer portion 300 to identify itself, by sending a unique identifier, such as its MAC address, to a paired key portion 400 and to an associated docking unit 200, which enables the SCM cabinet communication module 150 to associate or map each fob customer portion 300 to an associated docking unit 200 in the SCM cabinet. As will be appreciated by those of ordinary skill, this dynamic mapping of fob customer portions to docking units allows mapping of the customer portion to key portion to be automated and not dependent upon accurate placement of the customer vehicle keys by the operator/valet in a specified location in the cabinet. This simplifies operation of the system, preventing errors and misplaced vehicle keys. When a customer initiates a vehicle request on their respective customer portion 300, the system automatically activates the corresponding docking unit pickup indicator 221 to alert the operator to the precise location of the key of the requested vehicle within the SCM cabinet 100.

Fob Customer Portions

Figure 15:
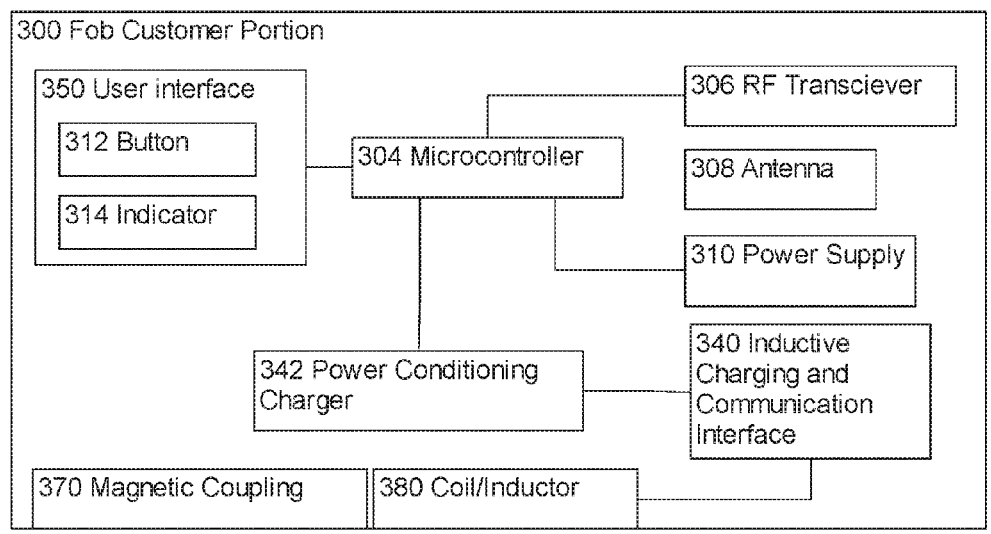
FIG. 15 is a schematic diagram of example components of a fob customer portion according to an aspect of the disclosure.

FIG. 15 is a schematic illustration of the components of an example fob customer portion 300 according to aspects of the disclosure. A customer portion microcontroller 304 controls an RF transceiver 306, which may utilize an internal antenna 308. Transceiver 306 may be a Semtech model SX1272. User interface 350 may include a push button 312 to enable a customer/user to initiate a vehicle request, and an indicator 314 for confirming the customer request and indicating additional information, such as status or error codes to the customer/user. Microcontroller 304 also controls a power conditioning charger 342 which may in turn control an inductive charging interface 340. Microcontroller may be a Model PIC18F47J13 8 bit microcontroller by Microchip Technology, Inc. of Chandler, Ariz., which may include an arbitrary function generator that may be utilized in routines for the inductive charging. A coil/inductor 380 made of wire turns and a small ferrous core may be provided as part of the inductive charging system. Power supply 310 may be in the form of a lithium-ion rechargeable battery. Voltage may be stabilized by a very low current voltage regulator. Transceiver 306 and microcontroller 304 may utilize deep sleep modes of operation to conserve power. A permanent magnet 370 may provide for secure attachment to a counterpart key portion 400.

Fob Key Portions

Figure 16:
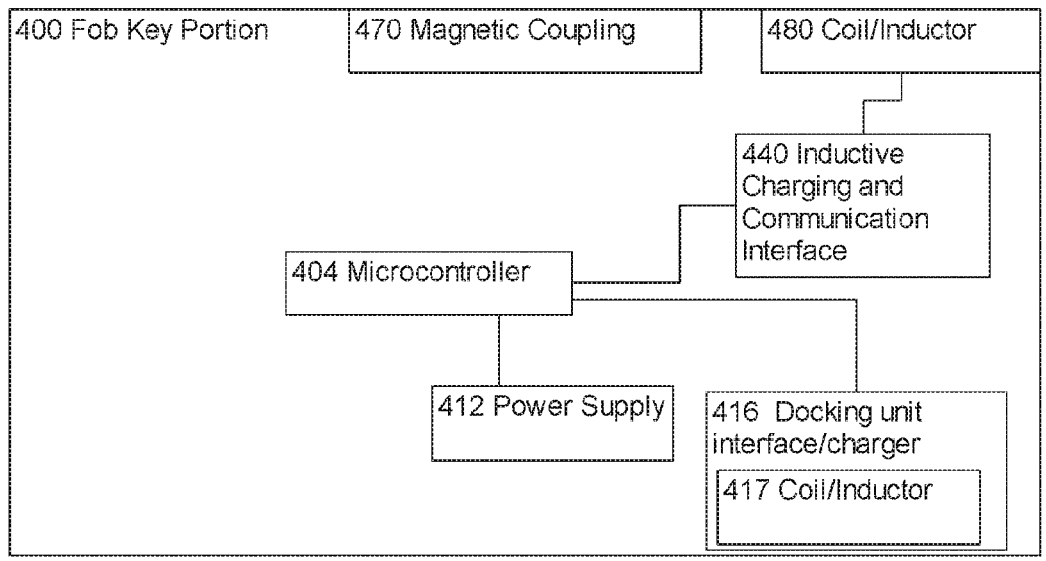
FIG. 16 is a schematic diagram of an example fob key portion according to aspects of the disclosure.

FIG. 16 is a schematic illustration of components in an example fob key portion 400 according to aspects of the disclosure. The fob key portion 400 functions to generate charging power and inductive charging signals to the fob customer portion 300. It also functions to transfer messages to a docking unit when inserted into the SCM cabinet (i.e., when it's mating customer portion 300 has been deployed to a customer). A key portion microcontroller 404, which may be an Model PIC 16F18345 8-bit microcontroller manufactured by Microchip Technology, Inc. of Chandler, Ariz., is in electronic communication with a power supply. A power supply 412, which may be a rechargeable battery, stabilized by a low current voltage regulator, provides power to the microcontroller 404 and other components. According to an aspect of the disclosure, power is continuously supplied to the microcontroller 404, which may operate under a deep sleep mode until pairing with a fob customer portion 300 occurs, or until the fob key portion 400 is inserted by itself into a docking unit. Microcontroller 404 also controls an inductive charging and communication interface 440, which provides for inductive transfer of power to a mated fob customer portion 300. An inductive wire coil 480 which includes wire wound around a ferrous core, provides for inductive power transfer to a counterpart coil 380 on the fob customer portion 300. A fob key portion magnetic coupling 470 may interact with its counterpart magnetic coupling 370 on the fob customer portion 300 to provide for a releasable magnetic interlock between the two portions 300,400.

Microcontroller 404 also controls a docking unit interface/charger 416 including a coil/inductor 417. Docking unit interface 416 functions to control charging of key portion 400 and messaging between the docking unit 200 and the key portion 400. The physical interface for inductive charging and communication between the docking unit 200 and the key fob portion 400 may be identical to that between the key fob portion 400 and the customer fob portion 300 to enable bi-directional communication via the inductive charging interface.

The inductive charging communication link permits two-way communication between the fob key portion 400 and the fob customer portion 300. This in turn obviates the need for an RF or other expensive communication link between the fob key portion 400 and the SCM cabinet communication module, and results in lower cost.

Fob Docking Units

FIG. 17 is a schematic illustration of the components of an example docking unit 200 according to an aspect of the disclosure. Microcontroller 210 may be a PIC 16F18345 model microcontroller manufactured by Microchip Technologies, Inc. of Chandler, Ariz. Communication between the docking units 200 and the SCM cabinet communications and management module 150 (FIG. 11) may be via an SCM communication module interface 212, which may be a hardware serial interface with appropriate physical connections to each docking unit 200 within the SCM cabinet. Power may be provided to microcontroller by a power supply 214, which may be a hardwired 6 volt DC power bus, and stabilized/regulated via voltage regulator 230. Microcontroller 210 controls a key portion charger interface 240 including a key portion charging coil/inductor 480 to generate charging current for the key portion when docked in the docking unit. A fob sensor 250 detects the presence of a key portion and may be a reed switch that is activated (closed) by one or both of the magnetic couplings provided on the key portion 400 and/or customer portion 300.

When a fob key portion 400 is inserted into the docking unit 200, the key portion 400 is detected by the fob sensor 250. Microcontroller 204 issues a command to begin charging the key portion battery 412 (FIG. 13) and issues a command to determine the unique identifier (MAC address) of the customer portion 300 previously associated with and communicated to the key portion 400, as described above. The communication and management module 150 of the SCM cabinet may then associate a particular customer portion 300 with a respective docking unit 200 in the SCM cabinet. Pick-up indicator LED 221 and charging indicator LED 223 are controlled by microcontroller 210.

Registration of Customer and Key Portions to Particular Docking Units

Figure 18:
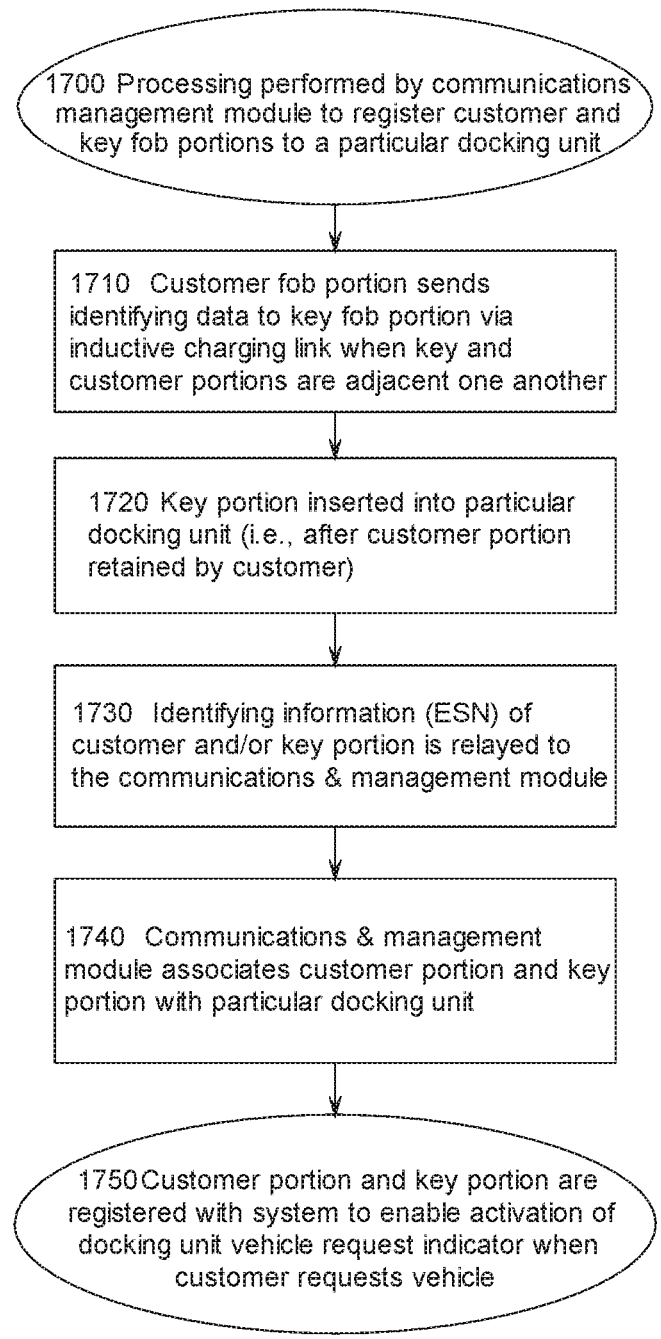
FIG. 18 is a flow chart illustrating an example method of registering a customer fob portion and a key fob portion to a docking unit according to aspects of the disclosure.

FIG. 18 is a flow chart illustrating an example process 1700 for registration of customer and key fob portions to particular docking units within the SCM. At 1710, the customer fob portion 300 sends/transfers identifying data to a key fob portion 400 with which it is mated and retained together via magnetic elements. The sending of identifying data may occur via the respective inductive charging elements as described above. At 1720, after the operator (valet) has separated the customer and key portions, given the customer portion to the customer and retained the key portion, the operator inserts the retained key portion into a docking unit. As will be recognized, according to aspects of the invention, the operator need not dock the key portion in any predetermined or particular docking unit as the system CMM will be able to determine which docking unit houses the key portion. At 1730, the key portion relays its identifying information (ESN), which may include identifying information for the customer fob portion with which it is associated, to the CMM via the docking unit inductive charging link. A magnetically operated reed switch on the docking unit may be utilized to sense the insertion of the key fob portion and initiate this step of relaying the identifying information via the inductive charging link. The identifying information for the inserted key fob portion, and associated customer fob portion, are then conveyed to the CMM as the docking units are periodically polled by the CMM.

Inductive Charging of Fob Customer Portions

As will be recognized, when the customer portion 300 and key portion 400 are proximate one another and held in an interlocked or mated position by magnetic coupling(s) 370 and 470, the respective coils 380, 480 form an inductive charging link. Key portion microcontroller 404 may be programmed to wake periodically, every 30 seconds for example, to determine whether or not a customer portion 300 is present in a mated position. This determination can be made by sensing the charge amplitude in coil 480, for example. Since the coils 380, 480 and associated capacitances in the onboard circuitry form a resonant tank circuit in the charging circuitry, the charge amplitude in coil 480 will differ significantly between a state when a customer portion is present and mated, and a state where no customer portion is present.

The inductive charging and communication interface 440 may include drive circuitry that includes MOSFET transistors which generate a square wave source signal for coil/inductor 480. The square wave frequency may be 100 KHz. As will be recognized, the pair of coils/inductors 480, 380 form a loosely coupled transformer which allows inductive power transfer between the portions.

Communication Via Inductive Charging System

In accordance with an aspect of the disclosure, the inductive charging link between the fob key portion 400 and fob customer portion 300 may be utilized to provide a low power communication link between these two portions. Low frequency modulation communication techniques may be utilized for communications between the fob customer portion and the fob key portion via the inductive charging circuitry. This communication link enables bi-directional messaging between the fob customer portion 300 and the fob key portion 400. This, in turn, permits a fob customer portion 300, which has a unique identifier, such as a MAC address, associated with its microcontroller 304, to identify itself to a fob key portion 400. The fob key portion 400 may then, in turn, be associated with a particular location/docking unit in the SCM cabinet by the SCM cabinet management module 150, for example, via a lookup table stored in memory, which may be built or updated dynamically as fob key portions are inserted/removed from respective docking units. Thus, when a vehicle request message, which includes the customer fob portion unique identifier, is received via the radio link 180 (FIG. 13) by the SCM cabinet communications and management module 150, the management module 150 may signal the request to the operator/valet using the docking station indicator on the associated docking unit.

According to an aspect of the disclosure, inductive charging messaging from the fob key portion 400 to the fob customer portion 300 may be implemented by amplitude modulation of the charging power signal to provide low data rate messaging to the customer portion 300. The inductive charging and communication interface 440 may modulate the amplitude of the charging power signal to the coil/inductor 480 according to a desired digital message to be transmitted to the customer portion 300. This may be as simple as full amplitude representing a "1" and zero amplitude representing a "0." The customer portion inductive charging and communications interface 340, under control of the microcontroller 304, may monitor the responsive current in the coil/inductor 380 and thereby receive the digital information.

Inductive charging messaging from the fob customer portion 300 to the fob key portion 400 may also be implemented by modulating the current in the customer portion coil 380, which, in turn, modulates the load of coil 380 as observed by the coil 480 of the fob key portion 400. More specifically, the inductive charging and communication interface 340 may modulate the charge current within the coil 380 according to a given message to be conveyed, such as a unique identifier, MAC address of the customer portion microcontroller 304. The fob key portion inductive charging and communication interface 440 may sense the resulting changes in the amplitude of the signal in the key portion coil 480 and thereby interpret the message that is sent from the customer portion 340. This messaging protocol may achieve data rates that are low, typically on the order of 100 bits/second, it is sufficient to convey small amounts of digital information, such as the unique identifier associated with the customer portion 300 that may be mated with, and inductively charged by, a given key portion 400. Additionally, this communication method is inexpensive, requiring no additional hardware, and obviates the need for RF signals between the two portions, which might interfere with the radio link between the SCM cabinet communication module and the fob customer portions in the overall system.

As will be recognized by those of skill in the art, example systems according to the disclosure may utilize two different systems and associated methods for for communication among the system components. One communication system makes use of RF signals for two-way communication from the SCM cabinet to the plurality of fob customer portions 300, some of which may be deployed to customers/users. Another communication system makes use of the induction charging link for communicating data from the fob key portion 400 to the customer portion 300.

Example Method of Operation

Figure 19:
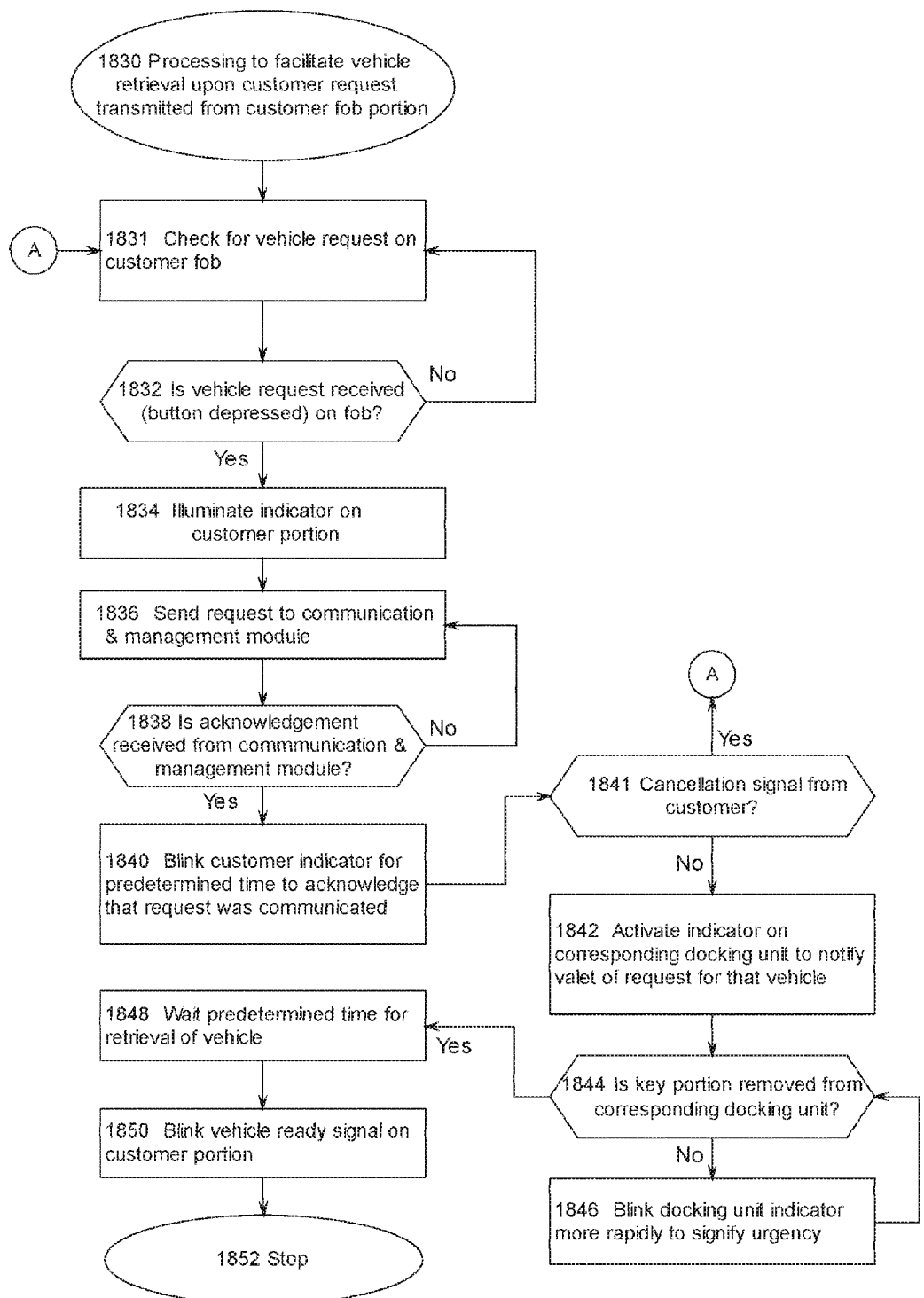
FIG. 19. is a flow chart illustrating an example method of facilitating vehicle retrieval with an example system according to an aspects of the disclosure.

An example method of operation for processing to facilitate vehicle retrieval upon a customer request initiated from a customer portion is illustrated in the flow chart in FIG. 19. The process begins at step 1831 where the customer portion microcontroller conducts a periodic check for a vehicle request initiated by a button (312) press on one of the plurality of deployed customer portions 300. At decision 1832, the customer portion determines whether or not a vehicle request is made on one of the customer portions. If not, the process returns to step 1831. If a request is detected, at step 1832, the indicator (314) is illuminated on the customer portion at 1834. At step 1836, a request is sent to the communication and management module. At step 1838, a decision is made as to whether or not the customer portion receives an acknowledgement from the communication and management module. If so, at step 1840 the indicator on the customer portion is illuminated for an extended, predetermined time to signify that the vehicle request was received by the valet. If no acknowledgement is received, the process returns to step 1836 to again send a request and again checks at 1838 for an acknowledgement. Once an acknowledgement is received from the CMM, the customer fob unit indicator may indicate a "wait" state in which the LED slowly blinks. After step 1840 signifying that the vehicle request was received, at 1842, the system activates the indicator on the docking unit corresponding to the customer portion from which the request was received. This correspondence was determined by the system previously when the particular customer portion was paired/mated with the key portion held within the particular docking unit. During the wait status of the customer fob portion, the customer may initiate a "cancel" request, for example, by depressing the interface button for an extended time and causing the customer fob portion to send a cancel request to the CMM. At step 1841, the system may check for a cancel request. If received, at 1843 the system CMM cancellation of the customer request and, if the docking unit "pick-up" indicator has already been activated, deactivates the indicator and branches to step 1831 in the control logic. If no cancel request is received, the system continues to activate the "pickup" indicator at 1842. At step 1844, the communications and management module 150 determines whether or not the key portion is removed from the corresponding docking unit—signifying that the valet has taken the keys to retrieve the requested vehicle. If the key portion has not yet been removed, the system indicates urgency by blinking the docking unit indicator more rapidly at step 1846. If the key portion has been removed, at step 1848, the system waits a predetermined time—corresponding to the average time it takes a valet to retrieve the vehicle, for example, and then at step 1850, sends a vehicle ready signal to the customer portion, which indicates the same status to the user.

Point-to-Multipoint Communication Gateway

According to an aspect of the disclosure, a single point to multipoint communication protocol may be utilized to enable communications between the communications module in the fob SCM cabinet and each one of the fob customer portions 300. The details of this point-to-multipoint communication protocol will be discussed herein. Referring again to FIG. 12, radio link 180 may be a 900 MHz ISM band signal and may comprise direct sequence spread spectrum ("DSSS") modulated data, which may be sent in packets to and from the fob customer portion 400 to the communication module 150. Time division duplex (TDD) techniques may be utilized to enable two-way data transfer and signaling on a single channel.

The communications module in the SCM cabinet may operate as a "master" communication controller, initiating global status and global system messages. Under this protocol, generally, no remote customer fob portion can transmit to the master unless the customer fob portion first receives predetermined data from the master. The communications module may further deploy firmware updates to the customer portions in periods of low operational activity. Generally, any customer portion that desires to communicate with the communications module 150 must first receive a unique packet of known byte length with a unique header and then transmit in a "listen window" and receive an acknowledgement from the SCM communications module 150 before any request or further messaging can be sent. Message headers are used to define listen windows and directed message windows. This protocol permits directed messages to individual customer portions as well as universal windows that are available for any fob to request a message. Each outgoing packet from the communication module may contain an ESN and a tag describing a hop sequence for security purposes.

Generally, the data packet that represents the unique header may occupy only a small portion, perhaps 10%, of the communications module listen window, leaving the remainder of the 100 millisecond window for the communications module to listen for responses from one or more fob customer portions. Most messages from the communications module 150 may be idle packets, where the data sent from the communications module acts as a beacon. Other packets may not be idle if the communications module (master) is in the process of exchanging data with a particular customer module. Different data lengths and header values may be used to distinguish message types to simplify decoding in the fob customer portion. When a customer activates the button on the fob customer portion, the customer fob portion first listens for an idle packet transmitted from the communications module and then responds within the listen window following that packet, responding with a message including the ESN or other identifying data for the customer portion and data representing an event, such as a first button press or second button press, etc. If the communications module receives the transmitted message intact, it responds with a packet unique to that customer fob portion by echoing the ESN thereof and sending an acknowledgement and status. To complete the exchange, the customer fob portion may acknowledge the message since the second portion of the listen window would be unavailable to any other customer fob portion. In a low traffic environment, few collisions would statistically occur. However, if the communications module does not respond due to two or more customer fob portions attempting to transmit at the same time, each may retry again according to a random wait time so that statistically, future collisions may be prevented.

Each communications module and associated cabinet may utilize a GPS time mark to establish the transmit window. This time marking may occur at a 1 second rate and is typically precise to within 10 nanoseconds. This time marking can thus be used to effectively synchronize each communications modules and cabinets within close proximity to one another to prevent miscommunication between systems operating in the vicinity of one another (i.e., neighboring valet parking systems). Different frequency channels may be utilized to prevent conflicts or jamming between neighboring systems. In addition, since all customer fob portions listen at the same time and transmit at the same time in a given system, customer fob portions from neighboring systems will not jam one another.

Figure 20:
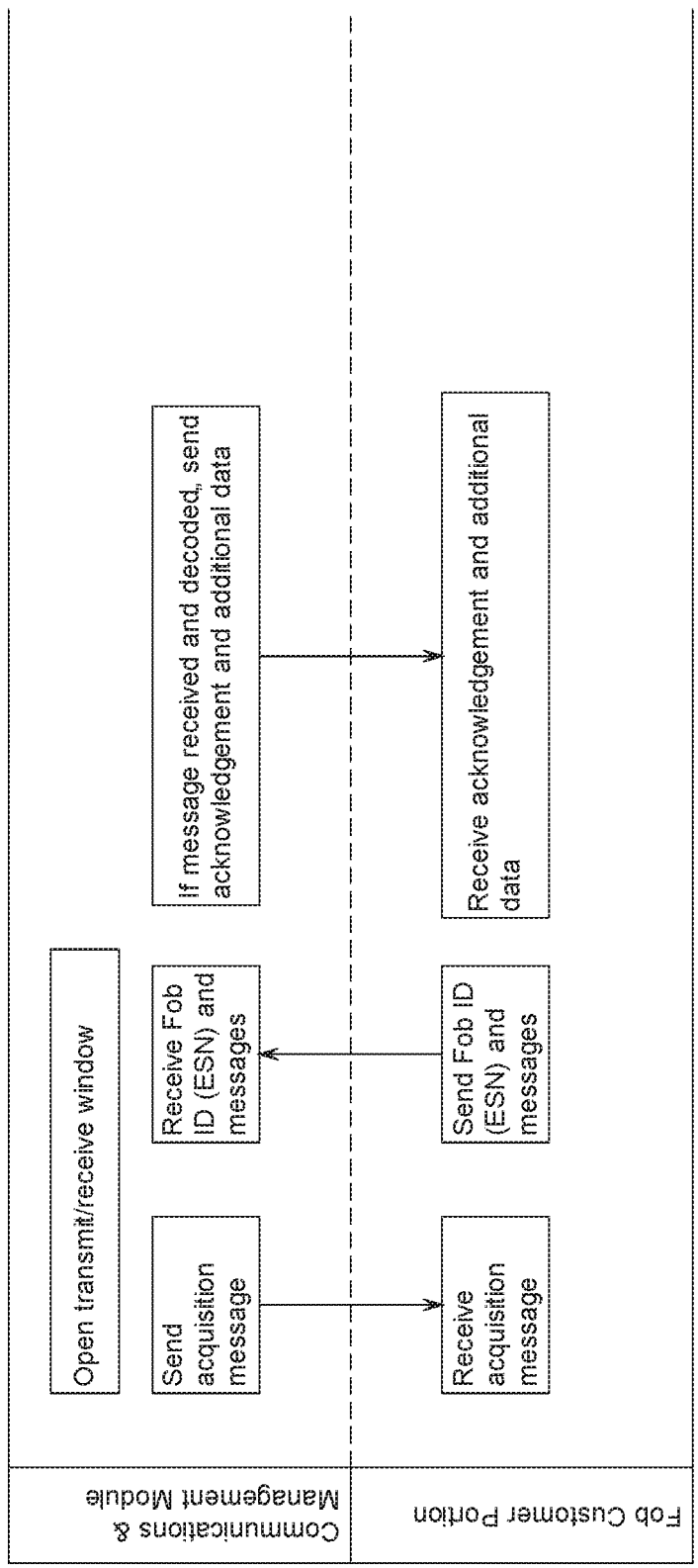
FIG. 20 is a swim lane diagram illustrating an example point to multipoint messaging method using a system according to an aspect of the disclosure.
Figure 21:
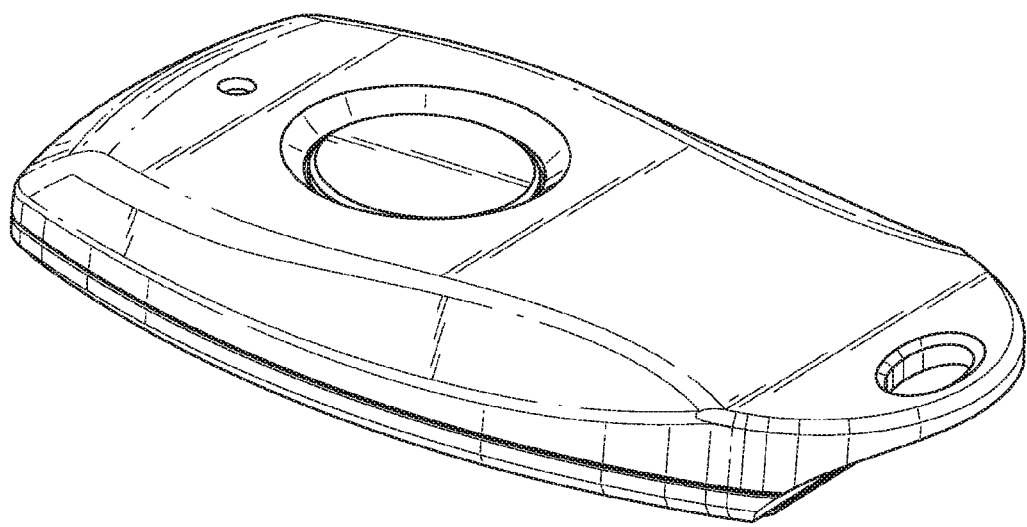
Figure 22:
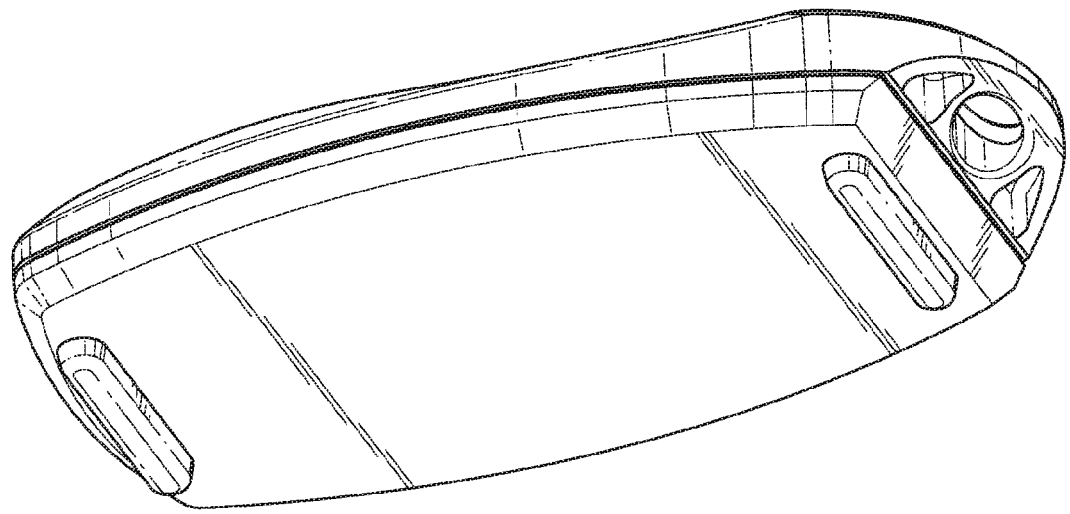
Figure 23:
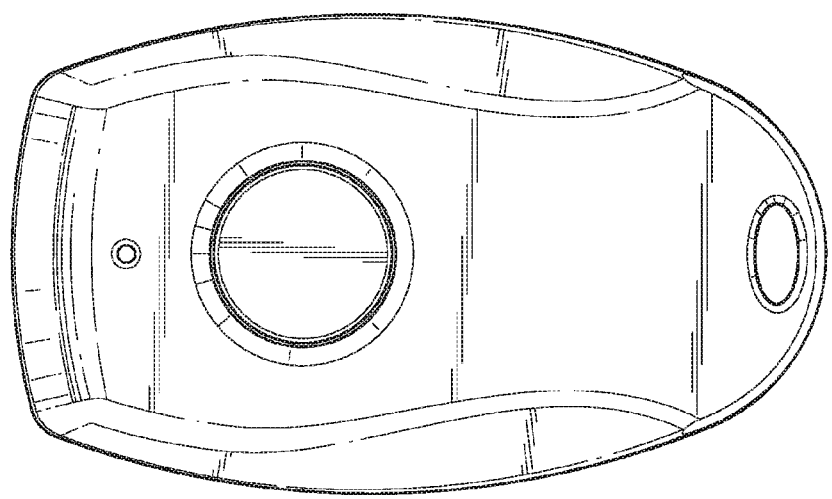
Figure 24:
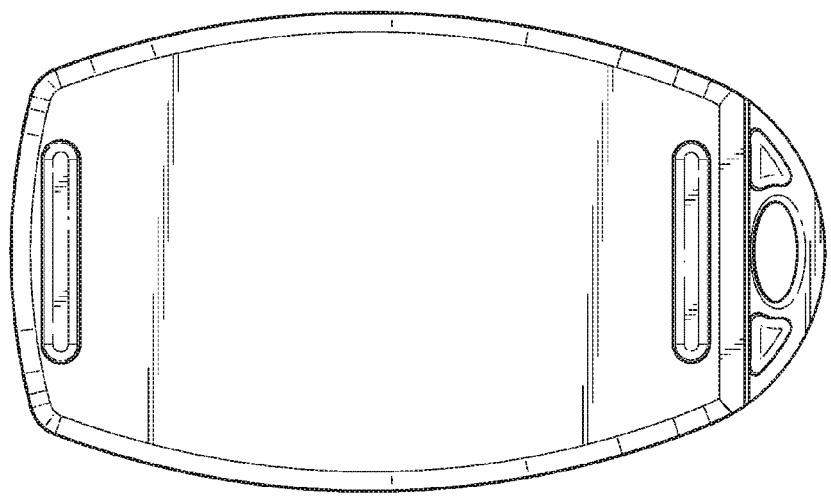
Figure 25:
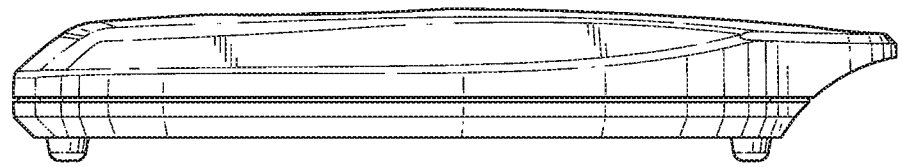
Figure 26:
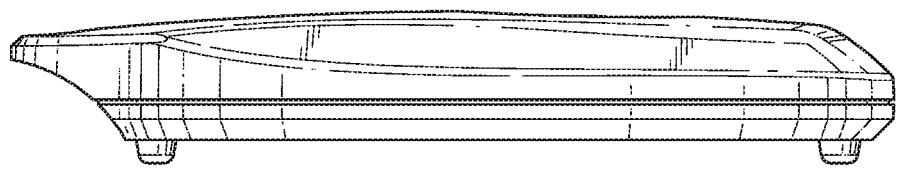
Figure 27:
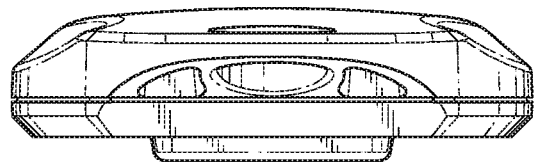
Figure 28:
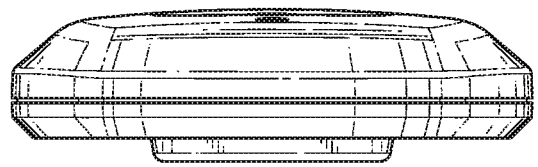

FIG. 20 illustrates a messaging protocol between the communications and management module 150 (FIG. 13) and the customer portions 300. The communication module may send a short acquisition message every 100 milliseconds, for example. This short packet may define the start of a transmit/receive window and may be sent on the same channel for a given panel. When a customer portion desires to send a message, it first listens for the acquisition message from the communication module. If the acquisition message is received by the customer portion, it transmits its own ID (MAC address) and any messages in the second half of the transmit/receive window, the timing of which may be defined by communications module. If the communication module successfully receives and decodes the message, it responds in the next 50 milliseconds window with an acknowledgement and any additional data that needs to be sent to that particular customer portion.

Customer and Vehicle Data Collection and Analysis

As will be recognized, the example systems described herein may be utilized to collect performance data for vehicle management, including response times by valet personnel, data relevant to customer satisfaction and feedback. Other data may include diagnostic information, performance information, usage trends and patterns, billing information, customer insight and general statistics. The CMM may include an Ethernet port or other interface for wired or wireless transmission of data. Additionally, access to a cellular or wide area network may provide for data collection and management of the system via mobile device or remote computer. Such systems may utilize TCP/IP, for example, where the CMM may be configured to act as a server to host such remote devices, which may execute suitable mobile applications to facilitate management and access/analysis of data.

Smartphone Interfacing

As will be recognized, systems according to aspects of the disclosure may be adapted to interface with smartphone or other portable devices running suitable applications thereon. The wide-area-network (WAN) interface of the communications and management module 150 (FIG. 12) may facilitate communication with smart devices via a remote server which supports TCP connections via a 3G or 4G wireless cellular network, for example. The communications and management module 150 may process messages and communicate with a server to populate a database with information including customer identifying information as well as the parking state of an associated vehicle. In addition, the disclosure contemplates systems in which the fob customer portion is replaced with customer smartphones or portable devices running applications that facilitate communication with the system. In such implementations, the fob key portion may be provided with a unique identifier, which is communicated to the customer and the smartphone application. Such unique identifiers for the fob key portion may be a barcode provided on the back of the fob key portion, which for example, may be scanned by a customer's smartphone application when the vehicle is left with the valet. To facilitate requests, the smartphone application may accept input from the customer and the fob key portion identifier is recalled by the application and relayed over the cellular data network, to a server and then to the communications and management module 150. In response, the communications and management module 150 may illuminate the appropriate docking unit indicator in the cabinet associated with the unique identifier to alert the valet that the corresponding vehicle is being requested.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents.

What is claimed is:

1. A system for vehicle management comprising:
a storage, communication and management (SCM) cabinet for storing, communicating with and managing a plurality of fob devices cooperatively associated with the SCM cabinet;
each of the fob devices comprising a customer fob portion to be deployed to a customer and a key fob portion to be associated with the keys of a respective vehicle for the customer, each customer fob portion including a customer fob portion communication and charging interface, and each key fob portion including a key fob portion communication and charging interface, whereby information and energy can be are conveyed between each key fob portion and a corresponding one of the customer fob portions to create a paired association between each key fob portion and a counterpart corresponding one of the customer fob portions;
the customer fob portion communication and charging interface and the key fob portion communication and charging interface providing for the association of each key fob portion with a corresponding one of the customer fob portions;
a plurality of docking units within the SCM cabinet, each docking unit including a docking unit charging and communications interface for charging and communicating with a corresponding fob device received in each docking unit, whereby information is communicated between the corresponding fob device and an SCM communications and management module;

the SCM communications and management module providing communication with the fob devices, the SCM communications and management module providing for the association of each fob device with a corresponding docking unit such that a customer request initiated on one of the customer fob portions results in activation of an indicator on a corresponding one of the docking units associated with the counterpart key fob portion.

2. The system of claim 1, wherein the customer fob portion and key fob portion of each of the fob devices include an inductive coupling whereby the key fob portions may transfer energy to the customer fob portion when the key fob portion is proximate a corresponding one of the customer fob portions.

3. The system of claim 2, wherein each key fob portion charging and communication interface includes a controller for transmitting data via the inductive coupling.

4. The system of claim 1, wherein each customer fob portion and each key fob portion are provided with a magnetic coupling for securing each customer fob portion to a corresponding one of each key fob portion.

5. The system of claim 4, wherein each customer fob portion includes at least one indexing projection and wherein each key fob portion includes at least one indexing slot to facilitate alignment of each customer fob portion with a corresponding one of each key fob portion.

6. The system of claim 1, wherein each docking unit includes a sensor for sensing the presence of a each docked key fob portion.

7. The system of claim 1, wherein the SCM cabinet includes a hinged interior panel for storing additional docking units and fob devices therein.

8. The system of claim 1, wherein the SCM communications and management module communicates wirelessly with the customer fob portions using a point to multipoint protocol.

9. The system of claim 1, wherein the docking units each include a key fob portion charger interface for inductively charging a corresponding one of the key fob portions when docked therein.

10. The system of claim 1, wherein the docking units include a charging indicator and a pick-up indicator.

11. The system of claim 1, wherein the customer fob portions include a user interface having a button and an indicator.

12. The system of claim 11, wherein the customer fob portions include a controller for signaling a vehicle ready status using the indicator.

13. The system of claim 11, wherein the customer fob portions include a controller for determining a cancellation request based on user interaction with the button.

14. A method of operating a system for vehicle management, the system comprising a storage, communication and management (SCM) cabinet for storing, communicating with and managing a plurality of fob devices cooperatively associated with the SCM cabinet, each fob device including a customer fob portion and a key fob portion, the method comprising:

physically pairing one of customer fob portions and the key fob portions together to form a mated pair;

electronically associating the customer fob portion to the key fob portion by transferring identifying data from the customer fob portion to the key fob portion while the customer fob portion and key fob portion are physically paired;

docking the key fob portion in a docking unit within the SCM cabinet;

electronically associating the key fob portion with the docking unit;

receiving a vehicle request from the customer fob portion; and activating an indicator on the docking unit in response to the received vehicle request.

15. The method of claim 14, further comprising the step of inductively charging the customer fob portion from the key fob portion.

16. The method of claim 14, wherein the step of transferring identifying data further comprises transferring data over an inductive charging link.

17. The method of claim 14, further comprising the step of charging the customer fob portion when it is physically mated to the key fob portion.

18. The method of claim 14, further comprising the step of charging the customer fob portion when it is physically mated to the key fob portion.

* * * * *